United States Patent
Uehara et al.

(10) Patent No.: US 7,897,286 B2
(45) Date of Patent: Mar. 1, 2011

(54) FUEL CELL SYSTEM AND METHOD OF DISCHARGING GAS FROM THE FUEL CELL SYSTEM

(75) Inventors: Junji Uehara, Saitama (JP); Yuji Matsumoto, Saitama (JP); Kenichiro Ueda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 580 days.

(21) Appl. No.: 11/542,738

(22) Filed: Oct. 4, 2006

(65) Prior Publication Data

US 2007/0077472 A1 Apr. 5, 2007

(30) Foreign Application Priority Data

Oct. 4, 2005 (JP) ................................. 2005-291609

(51) Int. Cl.
*H01M 8/06* (2006.01)
(52) U.S. Cl. .......... 429/408; 407/427; 407/428; 407/456
(58) Field of Classification Search .................... 429/13, 429/34, 25, 407, 408, 427, 428, 545, 456
See application file for complete search history.

(56) References Cited

U.S. PATENT DOCUMENTS

2004/0013919 A1 * 1/2004 Ueda et al. ...................... 429/22
2004/0229088 A1 * 11/2004 Hayashi et al. .................. 429/13

FOREIGN PATENT DOCUMENTS

| JP | 2000-243417 A |   | 9/2000 |
| JP | 2004-053344 | * | 9/2005 |
| JP | 2005-243491 |   | 9/2005 |

OTHER PUBLICATIONS

Japanese Notice for Reasons for Rejection for Application No. 2005-291609, dated Feb. 23, 2010.

* cited by examiner

*Primary Examiner* — Patrick Ryan
*Assistant Examiner* — Ben Lewis
(74) *Attorney, Agent, or Firm* — Nelson Mullins Riley & Scarborough LLP; Anthony A. Laurentano

(57) ABSTRACT

A fuel cell system includes: a fuel cell to which a reaction gas is supplied to generate electricity; a circulating system which returns unreacted reaction gas discharged from the fuel cell to an upstream of the fuel cell to thereby circulate the unreacted reaction gas; a discharge device which discharges the unreacted reaction gas from the circulating system; a first pressure detector which detects a pressure at a downstream of the discharge device; and a controller which controls an amount of discharged gas to be discharged from the circulating system by the discharge device, based on the pressure detected by the first pressure detector.

12 Claims, 5 Drawing Sheets

FUEL CELL SYSTEM AND METHOD OF DISCHARGING GAS FROM THE FUEL CELL SYSTEM

CROSS REFERENCE TO RELATED APPLICATIONS

This application claims the foreign priority benefit under Title 35, United States Code, §119(a)-(d) of Japanese Patent Application No. 2005-291609 filed on Oct. 4, 2005 in the Japan Patent Office, the disclosure of which is herein incorporated by reference in its entirety.

BACKGROUND OF THE INVENTION

The present invention relates to a fuel cell system and a method of discharging gas from the fuel cell system.

In recent years, developments have been promoted on fuel cell vehicles which are equipped with a fuel cell such as a PEFC (Polymer Electrolyte Fuel Cell). The fuel cell generates electricity when hydrogen is supplied to the anode and oxygen is supplied to the cathode. The fuel cell vehicle runs when electric power generated by the fuel cell rotates the motor.

In such a fuel cell, hydrogen is generally supplied to the anode for an amount more than required for hydrogen consumption in terms of improved output of the fuel cell. For this reason, the unused remaining hydrogen is discharged from the anode of the fuel cell. To improve the usability of hydrogen, a hydrogen circulating system has been adopted for returning the discharged unused hydrogen to the hydrogen supply side to thereby circulate the hydrogen.

When such a fuel cell generates electricity, water is generated at the cathode. A part of this generated water then permeates through the polymer electrolyte membrane (hereinafter referred to as an electrolyte membrane) and flows to the anode. In order to ensure humidity of the electrolyte membrane and thus to improve the diffusion (conductivity) of protons (hydrogen ions) of the electrolyte membrane, there has been proposed a method in which a reaction gas (air containing hydrogen and oxygen) which is supplied to the cathode or the anode of the fuel cell is humidified.

In the case of a fuel cell system using the hydrogen circulating system, the amount of water accompanying the circulated hydrogen increases as the advancement of generation of electricity, which may lead to a decrease in the power generation efficiency of the fuel cell. For this reason, according to Japanese Laid-open Patent Application No. 2000-243417 (see paragraph number [0022] and FIG. 1), the circulated hydrogen-containing gas is discharged at predetermined intervals, which is called as purging, so that the power generation efficiency of the fuel cell can be recovered. Since the discharged gas contains hydrogen, dilution gas (cathode off-gas) for diluting the discharged gas is introduced into an exhaust fuel diluter together with the discharged gas so that the discharged gas is diluted by the dilution gas and then emitted into the atmosphere.

However, the fuel cell vehicle runs on a highland where the atmospheric pressure is high and on a lowland where the atmospheric pressure is low. Therefore, according to the change in the atmospheric pressure, the pressure of the purge valve, by which gas is discharged from the hydrogen circulating system, changes at the downstream side.

If the purge valve is opened, regardless of the change in the atmospheric pressure, at a certain time interval to discharge the gas from the hydrogen circulating system, the amount of discharged gas to be discharged at a time when the purge valve is opened may be different because of the change in the atmospheric pressure. For example, when the vehicle runs under a low atmospheric pressure, the amount of discharged gas containing hydrogen exceeds the setting amount. This may cause the gas to be emitted into the atmosphere without being diluted sufficiently by the exhaust fuel diluter. On the contrary, when the vehicle runs under a high atmospheric pressure, the amount of discharged gas containing hydrogen lowers the setting amount. This may cause a delay in recovery of the power generation efficiency of the fuel cell.

With the foregoing drawbacks of the conventional fuel cell vehicles in view, the present invention seeks to provide a fuel cell system which can discharge gas in accordance with a change in an atmospheric pressure and a method of discharging gas from the fuel cell system.

SUMMARY OF THE INVENTION

According to a first aspect of the present invention, there is provided a fuel cell system including: a fuel cell to which a reaction gas is supplied to generate electricity; a circulating system which returns unreacted reaction gas discharged from the fuel cell to an upstream of the fuel cell to thereby circulate the unreacted reaction gas; a discharge device which discharges the unreacted reaction gas from the circulating system; a first pressure detector which detects a pressure at a downstream of the discharge device; and a controller which controls an amount of discharged gas to be discharged from the circulating system by the discharge device, based on the pressure detected by the first pressure detector.

With this construction of the fuel cell system, even if the pressure (downstream-side pressure) at the downstream of the discharge device (e.g., pressure detected by a pressure sensor 26 in the following embodiment) changes in accordance with a change in the atmospheric pressure, the controller controls the amount of discharged gas to be discharged from the circulating system by the discharge device, based on the downstream-side pressure. For example, when the downstream-side pressure is low, a control is made to decrease the amount of discharged gas so that an insufficient dilution of the exhaust fuel diluter positioned at the downstream of the discharge device can be prevented to thereby prevent high concentration of hydrogen from being emitted into the atmosphere. Meanwhile, when the downstream-side pressure is high, a control is made to increase the amount of discharged gas so that the power generation efficiency of the fuel cell can be recovered promptly while effectively utilizing the dilution performance of the exhaust fuel diluter.

In the aforementioned fuel cell system, the controller may control the amount of discharged gas as a discharge amount to be discharged at a time by the discharge device, based on the pressure detected by the first pressure detector.

The term "discharge amount to be discharged at a time" indicates the amount of gas to be discharged every time when the discharge device (e.g., purge valve 24 in the following embodiment) operates (when the purge valve 24 opens at one time according to the following embodiment).

According to this fuel cell system, for example, when the downstream-side pressure is low, decreasing "the discharge amount to be discharged at a time" enables to prevent an insufficient dilution of the exhaust fuel diluter and thus to prevent an emission of high concentration of hydrogen. Meanwhile, when the downstream-side pressure is high, increasing "the discharge amount to be discharged at a time" enables to discharge the gas while effectively utilizing the dilution performance of the exhaust fuel diluter.

In the aforementioned fuel cell system, the controller may control the amount of discharged gas by changing discharge intervals for the discharge device discharging the circulating gas, based on the pressure detected by the first pressure detector.

According to this fuel cell system, the amount of discharged gas to be discharged at a time by the discharge device is set, for example, to the lowest downstream-side pressure within the expected range while preventing an insufficient dilution and an emission of high concentration of hydrogen.

For example, when the downstream-side pressure is low, decreasing the discharge intervals enables to prevent an insufficient dilution and therefore an emission of high concentration of hydrogen in the end. Meanwhile, when the downstream-side pressure is high, increasing the discharge intervals enables to discharge the gas while effectively utilizing the dilution performance of the exhaust fuel diluter.

Further, controlling the discharge intervals based on the downstream-side pressure makes it possible to set the number of operations of the discharge device to a proper value. Therefore, it is possible to decrease, for example, the number of operations of a valve which constitutes the discharge device, which leads to an improved durability of the valve.

Further, when the downstream-side pressure is low, a control is made to decrease the discharge amount to be discharged at a time by the discharge device as well as to decrease the discharge intervals. On the other hand, when the downstream-side pressure is high, a control is made to increase the discharge amount to be discharged at a time by the discharged device as well as to increase the discharge intervals. This can allow the total discharge amount per unit of time (e.g., five minutes) to be constant in consideration of the cases in which the downstream-side pressure is low and the downstream-side pressure is high. In other words, notwithstanding that the downstream-side pressure is low or high, it is possible to discharge a constant amount of gas by taking into account a series of discharge per unit of time and thus to equally recover the power generation efficiency of the fuel cell.

Herein, a series of discharge per unit of time indicates the following cases as shown in FIG. 5, that is, the whole discharge made by a series of opening/closing operations of the purge valve 24 such as (1) when the downstream-side pressure is low, the purge valve 24 is opened five times per unit of time T to discharge the gas (see FIG. 5(b)), and (2) when the downstream-side pressure is high, the purge vale 24 is opened four times per unit of time T to discharge the gas (see FIG. 5(a)).

In the aforementioned fuel cell system, the controller may control such that as the pressure detected by the first pressure detector lowers, the amount of discharged gas to be discharged at a time becomes smaller and the discharge intervals become shorter.

According to this fuel cell system, the controller controls such that as the downstream-side pressure is low, the amount of discharged gas to be discharged at a time becomes smaller and the discharge intervals become shorter. Therefore, a series of discharge allows a constant amount of gas to be discharged per unit of time while preventing an emission of high concentration of hydrogen.

Therefore, (1) when the downstream-side pressure is low, the hydrogen discharge time control value t2 for opening the purge valve 24 is set to decrease the amount of discharged gas and the hydrogen discharge interval control value t12 for closing the purge valve 24 is set to decrease the time intervals for discharging hydrogen (see FIG. 5(b)), and (2) when the downstream-side pressure is high, the hydrogen discharge time control value t1 for the purge valve 24 is set to increase the amount of discharged gas and the hydrogen discharge interval control value t11 is set to increase the time intervals for discharging hydrogen (see FIG. 5(a)). As a result, the substantially constant amount of gas can be discharged by the series of discharge operations per unit of time.

The aforementioned fuel cell system may further include a second pressure detector which detects a pressure at an upstream of the discharge device, and the controller may control the amount of discharged gas to be discharged from the circulating system by the discharge device, based on a differential pressure between the pressures detected by the first and second pressure detectors.

According to this fuel cell system, the amount of discharged gas is controlled based on the differential pressure (differential pressure before and behind the discharge device) between the pressure at the downstream of the discharge device (i.e., downstream-side pressure) and the pressure at the upstream of the discharge device (i.e., upstream-side pressure), and therefore a more suitable control is available. The downstream-side pressure is preferably the pressure detected at right downstream of the discharge device, and the upstream-side pressure is preferably the pressure detected at right upstream of the discharge device.

In the aforementioned fuel cell system, the controller may control such that as the differential pressure is larger, the amount of discharged gas to be discharged at a time becomes smaller and the discharge intervals become shorter.

According to this fuel cell system, the controller controls such that as the differential pressure is larger, the amount of discharged gas to be discharged at a time becomes smaller and the discharge intervals become shorter. Therefore, a series of discharge allows a constant amount of gas to be discharged per unit of time (unit of time T in the following embodiment; see also FIG. 5) while preventing an emission of high concentration of hydrogen.

In the aforementioned fuel cell system, the downstream-side pressure may be an atmospheric pressure.

According to this fuel cell system, a correction is made based on the atmospheric pressure (downstream-side pressure), thereby allowing the discharge of the gas in accordance with the external environment.

The aforementioned fuel cell system may further comprise an atmospheric pressure sensor for detecting an atmospheric pressure, and the controller may control the amount of discharged gas to be discharged from the circulating system by the discharge device, based on the differential pressure and the atmospheric pressure.

According to this fuel cell system, the controller can control the discharge device in a more suitable manner based on the differential pressure before and behind the discharge device and the atmospheric pressure.

According to a second aspect of the present invention, there is provided a method of discharging gas from a fuel cell system including: a fuel cell to which a reaction gas is supplied to generate electricity; a circulating system which returns unreacted reaction gas discharged from the fuel cell to an upstream of the fuel cell to thereby circulate the unreacted reaction gas; and a discharge device which discharges the unreacted reaction gas from the circulating system. The method comprises the steps of: detecting a pressure at a downstream of the discharge device with a first pressure detector; and controlling an amount of discharged gas to be discharged from the circulating system by the discharge device, based on the pressure detected by the first pressure detector.

According to this method, the amount of discharged gas to be discharged from the circulating system by the discharge device can be controlled based on the downstream-side pressure that is changed in accordance with a change in the atmospheric pressure. Therefore, it is possible to effectively utilize the dilution performance of the exhaust fuel diluter and to prevent an emission of high concentration of hydrogen.

Other features and advantages of the present invention will be apparent from the following detailed description with reference to the accompanying drawings.

BRIEF DESCRIPTION OF THE DRAWINGS

The aspects of the present invention will become more apparent by describing in detail illustrative, non-limiting embodiment thereof with reference to the accompanying drawings, in which.

DESCRIPTION OF THE PREFERRED EMBODIMENT

Figure 1:
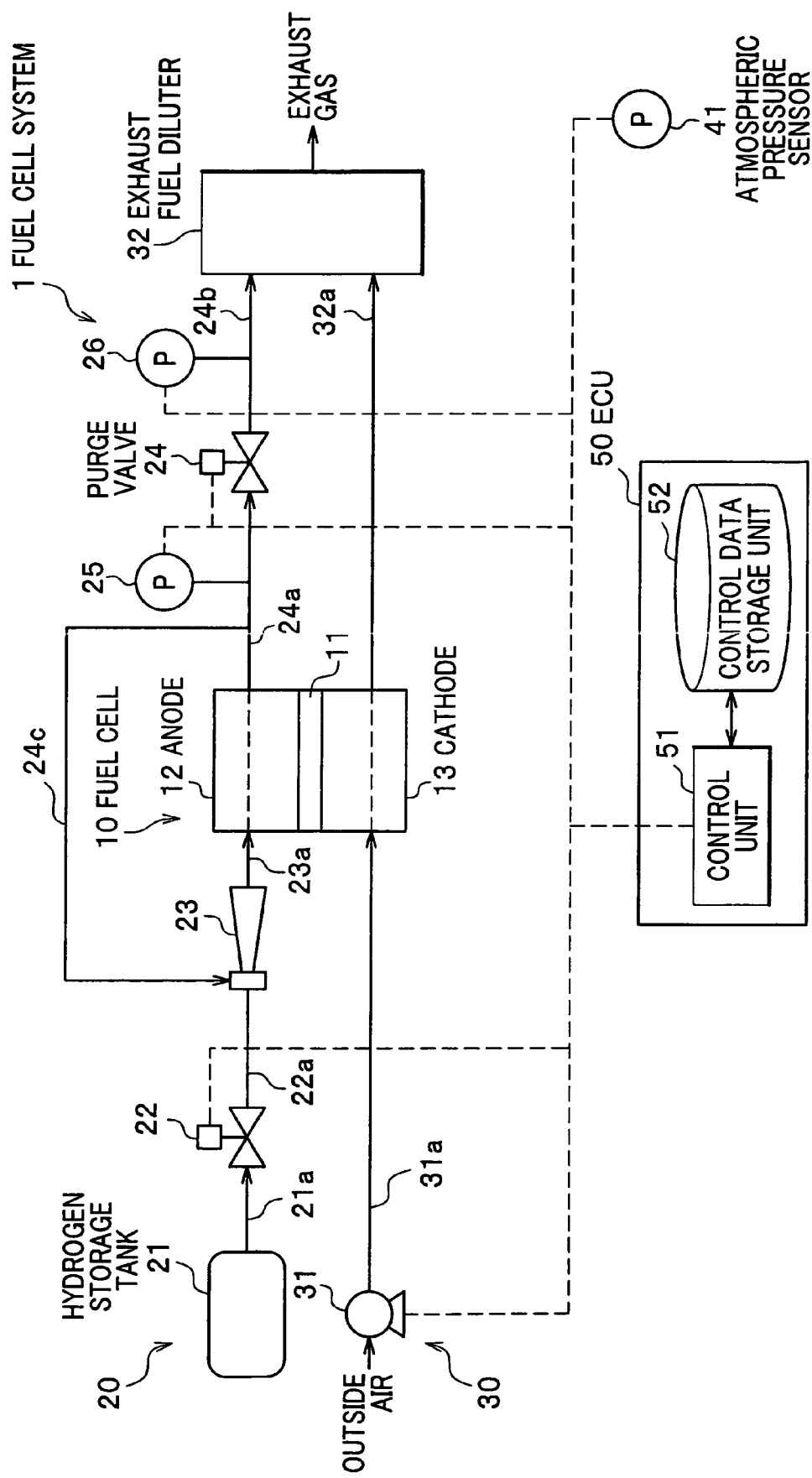
FIG. 1 is a block diagram illustrating the configuration of a fuel cell system according to one embodiment of the present invention.

One preferred embodiment of the present invention will be described below with reference to FIGS. 1 to 5.
Configuration of Fuel Cell System A fuel cell system 1 according to this embodiment is mounted on a fuel cell vehicle. The fuel cell system 1 includes a fuel cell 10 and a driving motor (not shown) connected with an output terminal (not shown) of the fuel cell 10. The fuel cell vehicle runs on a lowland where the atmospheric pressure is high and on a highland where the atmospheric pressure is low when electric power generated by the fuel cell 10 rotates the motor.

The fuel cell system 1 mainly consists of the fuel cell 10, an anode system 20 for supplying and discharging hydrogen (i.e., fuel gas, reaction gas, etc.) to and from the fuel cell 10, a cathode system 30 for supplying and discharging air containing oxygen (i.e., oxidant gas, reaction gas, etc.) to and from the fuel cell 10, an atmospheric pressure sensor 41, and an ECU (Electric Control Unit) 50 for electrically controlling the fuel cell system 1.
Fuel Cell The fuel cell (fuel cell stack) 10 is a polymer electrolyte fuel cell which includes a plurality of stacked single cells. Each single cell consists of an MEA (Membrane Electrode Assembly) and a pair of separators for sandwiching the MEA. The MEA consists of an electrolyte membrane (polymer electrolyte membrane) 11, an anode (fuel pole) 12, and a cathode (oxygen pole) 13, and the both sides of the electrolyte membrane 11 is sandwiched by the anode 12 and the cathode 13. The separator has grooves for supplying a reaction gas over the whole surfaces of the MEA, and through holes for introducing hydrogen and oxygen toward the whole single cells. These grooves and the through holes function as an anode-side passage (reaction gas passage) and a cathode-side passage (reaction gas passage). Namely, hydrogen as a fuel gas flows through the anode-side passage so that hydrogen is supplied to the anode of each single cell, and air containing oxygen as an oxidant gas flows through the cathode-side passage so that oxygen is supplied to the cathode of each single cell.

When hydrogen is supplied to the anode and air containing oxygen is supplied to the cathode of the fuel cell 10, an electrochemical reaction occurs on the catalysts (e.g., platinum (Pt) or the like) contained in the anode and the cathode, so that a potential difference occurs on each single cell. The fuel cell 10 generates electricity when an external load such as a motor (not shown) sends a power generation request to the fuel cell 10 where such a potential difference exists on each single cell.
Anode System Anode system 20 mainly consist of a hydrogen storage tank 21 for storing hydrogen, a shut-off valve 22, an ejector 23, a purge valve (discharge device) 24 a pressure sensor (second pressure detector) 25, and a pressure sensor (first pressure detector) 26.

The hydrogen storage tank 21 is connected to the shut-off valve 22 through a line 21a, and the shut-off valve 22 is connected to the ejector 23 through a line 22a. The ejector 23 is further connected to the anode 12 of the fuel cell 10 through a line 23a. The line 23a is provided with a pressure reducing valve (not shown). When the shut-off valve 22 is opened under the control of the control unit 51 of the ECU 50, hydrogen is supplied to the anode 12 after it is decompressed by the pressure reducing valve.

A line 24a, the purge valve 24, a line 24b, and the exhaust fuel diluter 32 are arranged in this order at the downstream of the anode 12. A line (circulating system) 24c is branched off from an intermediate portion of the line 24a, and is connected to the ejector 23.

The purge valve 24 is opened and closed at appropriate timings under the control of the control unit 51 of the ECU 50. When the purge valve 24 is closed, anode off-gas which contains unreacted hydrogen discharged from the anode 12 is returned to the ejector 23 through the line 24c, thereby circulating hydrogen. On the contrary, when the purge valve 24 is opened, the anode off-gas is supplied to the exhaust fuel diluter 32 through the line 24b.

The pressure sensor (second pressure detector) 25 is provided in the line 24a. The pressure sensor 25 detects a pressure (immediate upstream-side pressure) at right upstream of the purge valve 24. The pressure sensor (first pressure detector) 26 is provided in the line 24b. The pressure sensor 26 detects a pressure (immediate downstream-side pressure) at right downstream of the purge valve 24. Further, the pressure sensors 25 and 26 are connected to the control unit 51 of the ECU 50 so that the control unit 51 monitors the upstream-side pressure and the downstream-side pressure.
Cathode System Cathode system 30 mainly includes a compressor (supercharger; reaction gas supplying device) 31, and the exhaust fuel diluter 32. The compressor 31 takes in and compresses the outside air containing oxygen (reaction gas), and thereafter supplies the compressed outside air as the oxidant gas to the cathode 13 of the fuel cell 10. The compressor 31 is connected to the cathode 13 through a line 31a. A humidifier (not shown) is provided in the line 31a so that the air to be supplied to the cathode 13 is humidified when necessary.

The exhaust fuel diluter 32 is connected to the fuel cell 10 at the downstream of the cathode 13 through a line 32a. The exhaust fuel diluter 32 dilutes hydrogen contained in the anode off-gas discharged from the anode system 20. The exhaust fuel diluter 32 has a dilution space, into which the cathode off-gas (dilution gas) discharged from the cathode 13 and the anode off-gas containing hydrogen from the anode system 20 are introduced. When the anode off-gas and the cathode off-gas are introduced into the dilution space, hydrogen contained in the anode off-gas is diluted with the cathode off-gas so that the hydrogen concentration lowers below a predetermined concentration. This diluted gas is then emitted into the atmosphere.

Atmospheric Pressure Sensor

An atmospheric pressure sensor 41 detects the atmospheric pressure. The atmospheric pressure sensor 41 is provided at a predetermined position of the fuel cell vehicle. The atmospheric pressure sensor 41 is connected to the control unit 51 of the ECU 50 so that the control unit 51 monitors the atmospheric pressure.

ECU

The ECU 50 electrically controls the fuel cell system 1, and mainly consists of a CPU, a ROM, a RAM, various kinds of interfaces, and electronic circuits. The ECU 50 has the control unit (controller) 51 and a control data storage unit 52.

Control Unit

The control unit 51 is connected to the shut-off valve 22, the purge valve 24 and the compressor 31 so as to control them when necessary. The control unit 51 is also connected to the pressure sensors 25, 26 and the atmospheric pressure sensor 41 so as to monitor the respective pressures. Further, the control unit 51 determines the operating conditions of the purge valve 24 based on the respective pressures.

Control Data Storage Unit

The control data storage unit 52 stores a referential hydrogen-discharge time (second/operation), a referential hydrogen-discharge interval (second), and a predetermined lowest pressure, which are obtained from pilot studies or simulations. The referential hydrogen-discharge time (second/operation) indicates time for discharging the anode-off gas (hydrogen) at a time under a referential pressure, during which the purge valve 24 is continuously opened. The referential pressure is a referential atmospheric pressure (outside air pressure), and is, for instance, the atmospheric pressure at an altitude of 1,000 meters. The referential hydrogen-discharge interval indicates an interval for opening the purge valve 24 under the referential pressure. The predetermined lowest pressure indicates, for instance, the lowest atmospheric pressure in the range where traveling of the fuel cell vehicle is ensured (e.g., the atmospheric pressure at an altitude of 2,000 meters).

Figure 2:
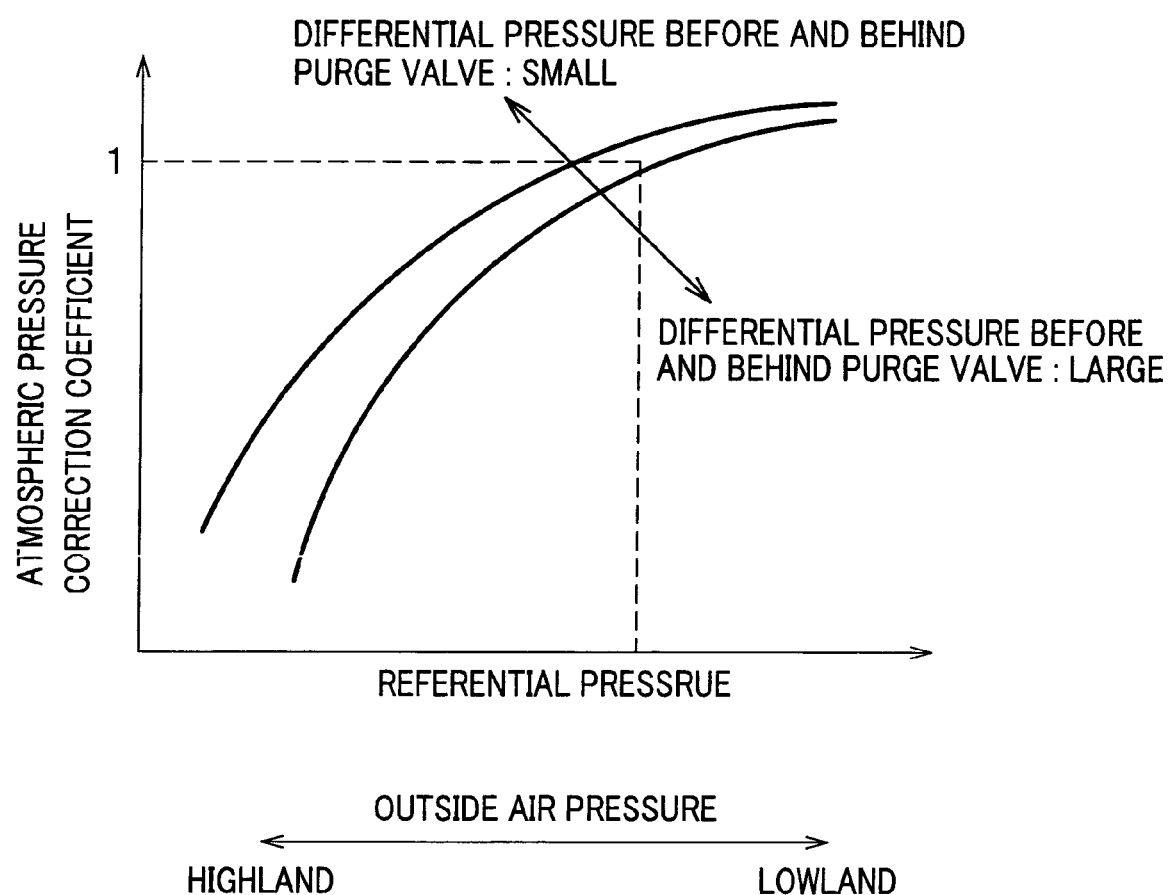
FIG. 2 is a map for calculating the atmospheric pressure correction coefficient.

The control data storage unit 52 stores a map for calculating an atmospheric pressure correction coefficient (see FIG. 2). The atmospheric pressure correction coefficient is a coefficient for determining operating conditions of the purge valve 24 such as a hydrogen discharge time control value (second/operation) as time for opening the purge valve 24 and a hydrogen discharge interval control value (second) as an interval for opening the purge valve 24. The atmospheric pressure correction coefficient becomes smaller as the outside air pressure lowers when the fuel cell vehicle runs on a highland. Further, the atmospheric pressure correction coefficient becomes smaller as the differential pressure before and behind the purge valve 24 becomes greater.

Operation of Fuel Cell System

Operation of the fuel cell system 1 will be described mainly with reference to FIGS. 3 and 4.

Figure 3:
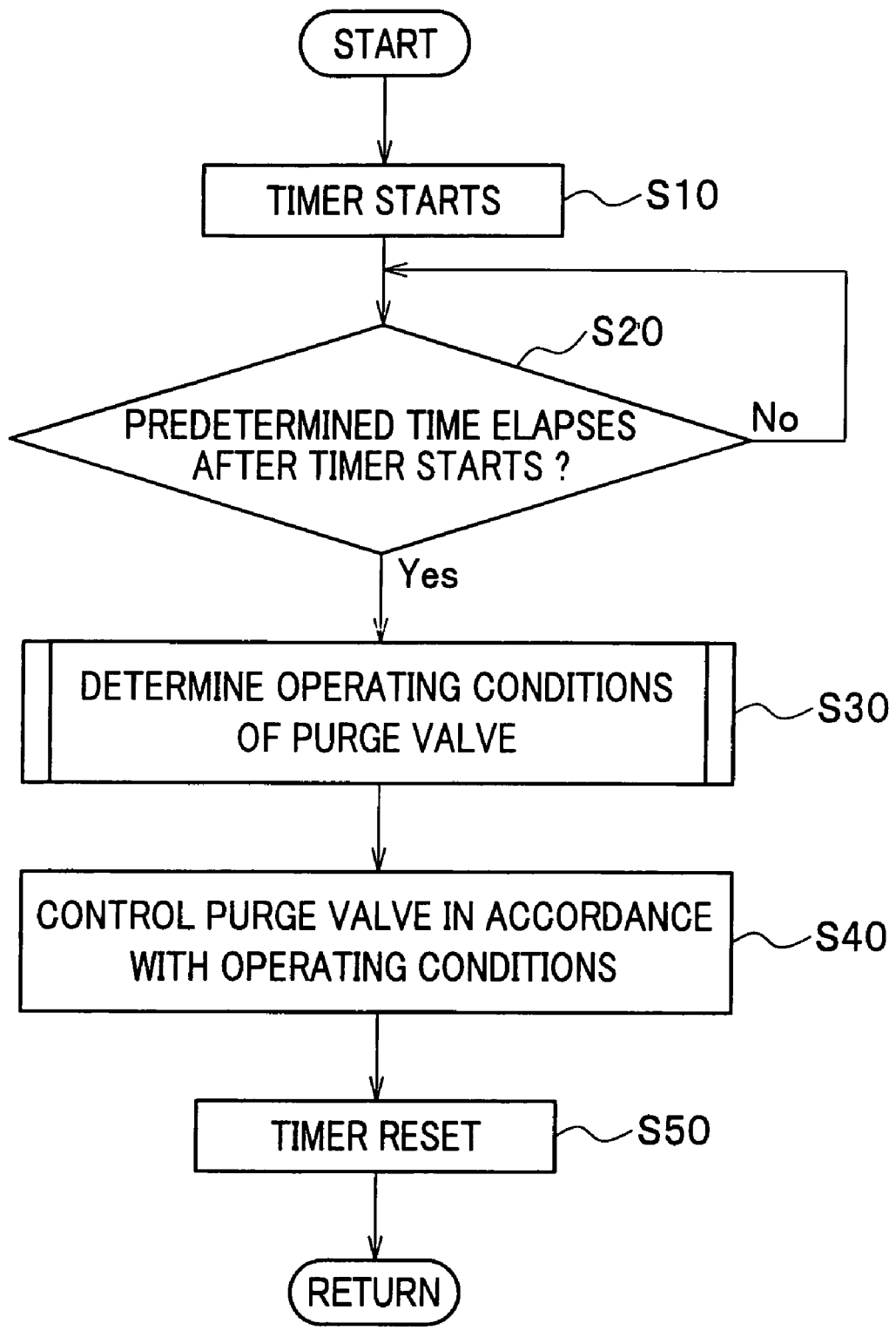
FIG. 3 is a flow chart showing the operation of the fuel cell system.
Figure 4:
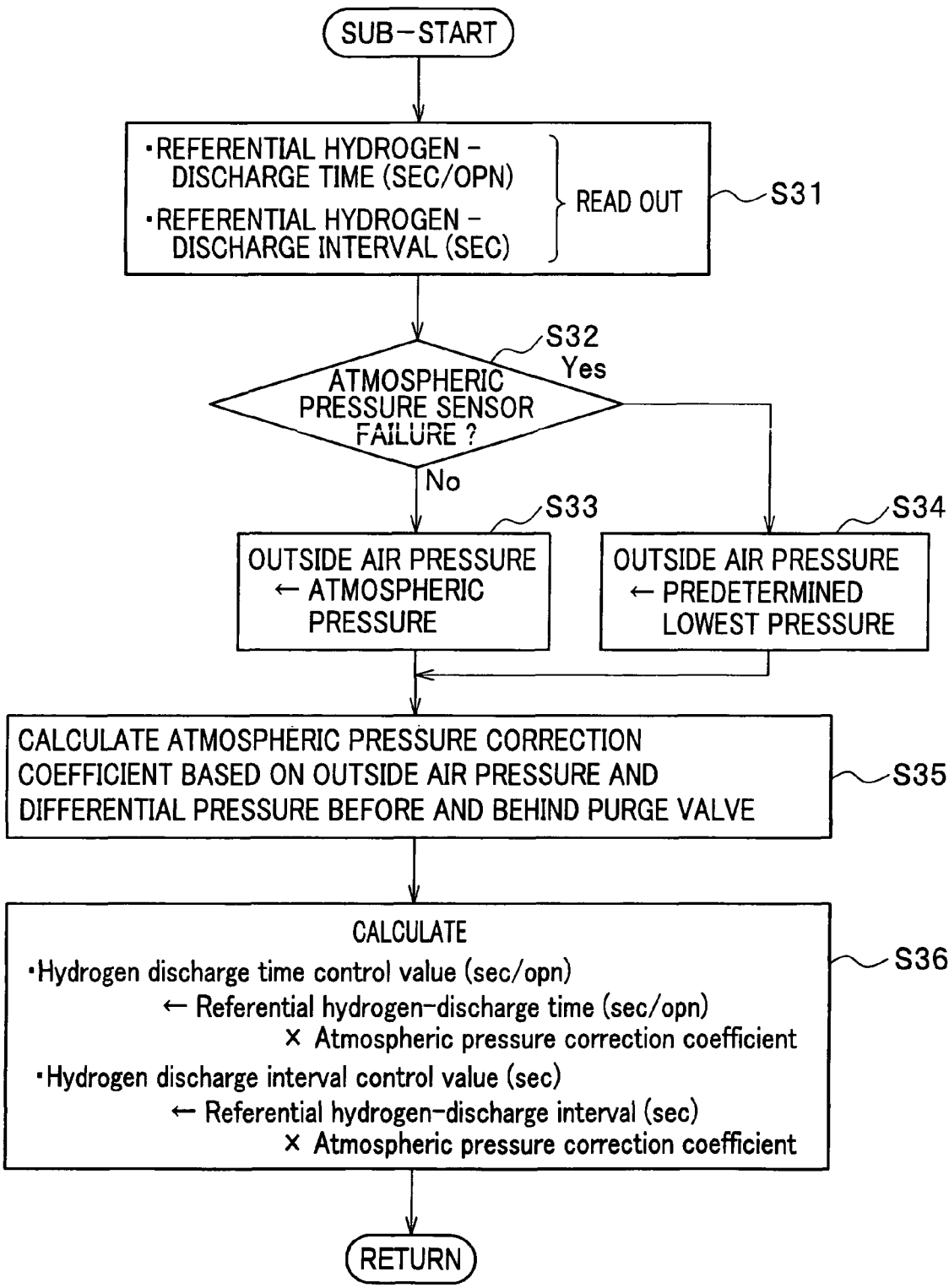
FIG. 4 is a flow chart showing the operating condition determination process for the purge valve as shown in FIG. 2.

Referring now to FIG. 3, the basic operation of the fuel cell system 1 will be described. The fuel cell vehicle (fuel cell system 1) repeats the respective steps during the actuation thereof.

In step S10, the control unit 51 starts the timer by utilizing a built-in clock. The control unit 51 then checks in step S20 whether or not a predetermined time has elapsed after starting the timer. If the control unit 51 determines that the predetermined time has elapsed (S20; Yes), then the operation proceeds to step S30. If the control unit 51 determines that the predetermined time has not elapsed (S20; No), then step S20 is repeated.

In step S30, the control unit 51 determines the operating conditions of the purge valve 24. Details of the operating conditions will be described later. In step S40, the control unit 51 controls the purge valve 24 for a predetermined period of time in accordance with the operating conditions determined in step S30. Thereafter, the timer is reset in step S50. The operation then proceeds to "RETURN" and returns to "START".

Next, with reference to FIG. 4, description will be given to the determination process S30 for determining the operating conditions of the purge valve 24. In step S31, the control unit 51 reads out the referential hydrogen-discharge time (second/operation) and the referential hydrogen-discharge interval (second) from the control data storage unit 52.

In step S32, the control unit 51 determines whether or not the atmospheric pressure sensor 41 malfunctions. If the control unit 51 determines that the atmospheric pressure sensor 41 malfunctions (S32; Yes), the operation proceeds to step S34. It is determined that the atmospheric pressure sensor 41 malfunctions, for example, when the atmospheric pressure sensor 41 does not send a detection signal. Meanwhile, if the control unit 51 determines that the atmospheric pressure sensor 41 does not malfunction and normally operates (S32; No), the operation then proceeds to step S33.

In step S33, the control unit 51 substitutes the atmospheric pressure detected by the atmospheric pressure sensor 41 into the outside air pressure to be used for the calculation of the atmospheric pressure correction coefficient.

In step S34, the control unit 51 substitutes the predetermined lowest pressure stored in the control data storage unit 52 into the outside air pressure.

In step S35, the control unit 51 refers to the map as shown in FIG. 2, and calculates the atmospheric pressure correction coefficient based on the outside air pressure and the differential pressure before and behind the purge valve 24. As described above, since the correction is made in consideration of the outside air pressure and the differential pressure before and behind the purge valve 24 the atmospheric pressure correction coefficient can be is calculated in a more suitable manner.

In step S36, the control unit 51 calculates the hydrogen discharge time control value (second/operation) and the hydrogen discharge interval control value (second) as the operating conditions of the purge valve 24 in accordance with the following equations (1) and (2).

Hydrogen discharge time control value (sec/opn)
=Referential hydrogen-discharge time (sec/opn)×
Atmospheric pressure correction coefficient (1)

Hydrogen discharge interval control value (sec)=Referential hydrogen-discharge interval (sec)×Atmospheric pressure correction coefficient (2)

Thereafter, the operation proceeds to "RETURN" and then to step S40 as shown in FIG. 3.

One Operation Example of Fuel Cell System

Figure 5:
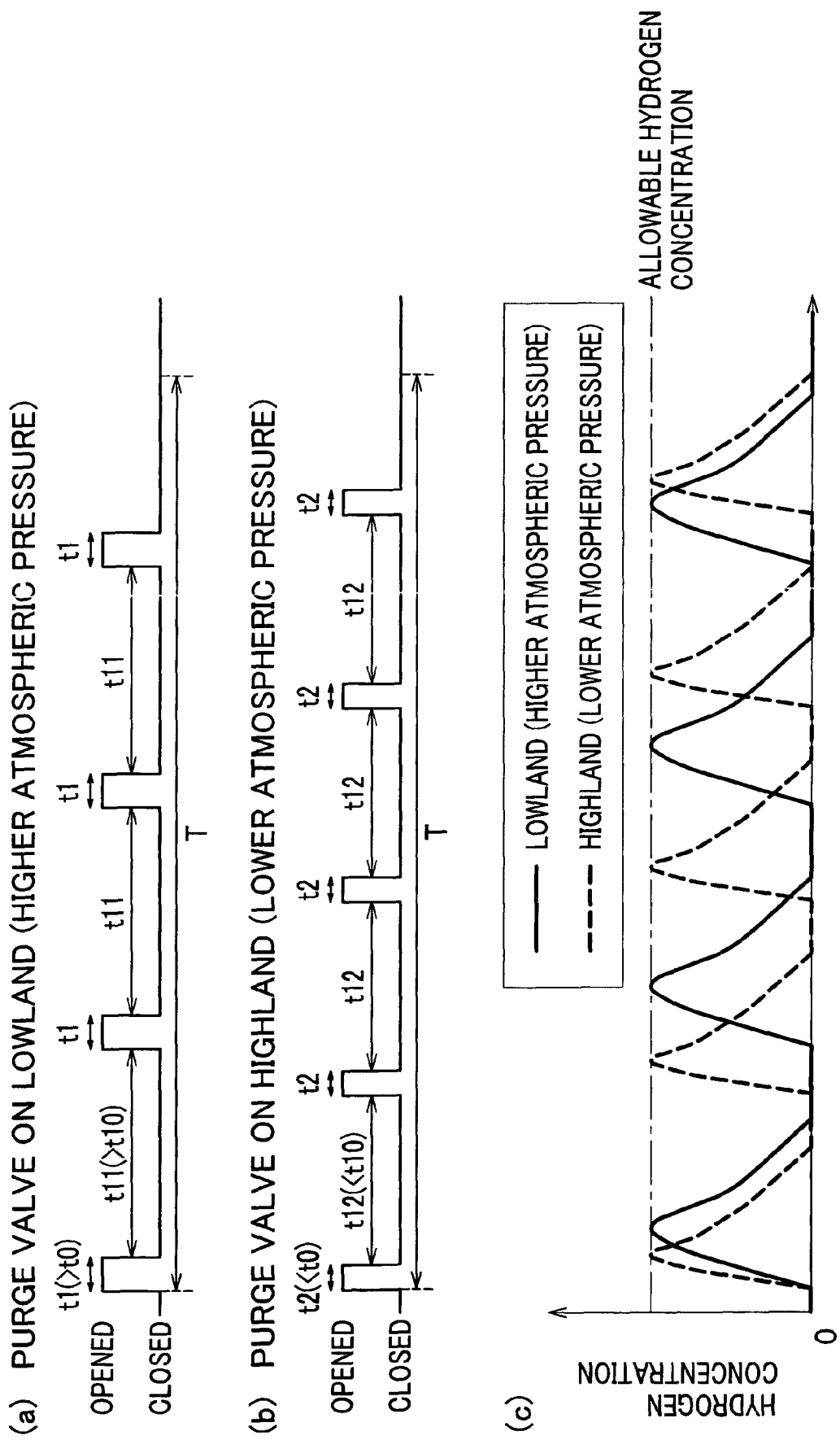
FIG. 5 shows time charts, in which (a) is a time chart for the purge valve at a lowland (under high atmospheric pressure), (b) is a time chart for the purge valve at a highland (under low atmospheric pressure), and (c) is a graph showing change of hydrogen concentration with elapse of time.

Next, one operation example of the fuel cell system 1 will be described mainly with reference to FIG. 5. Description will be given to the cases in which the fuel cell vehicle runs on a lowland and a highland, respectively. Referring to FIG. 5, other conditions except the atmospheric pressure, namely, the differential pressure before and behind the purge valve 24 the temperature of the anode off-gas, and the humidity of hydrogen are set to be identical.

Running on Lowland

When the fuel cell vehicle runs on a lowland, the outside air pressure (atmospheric pressure) becomes higher than the referential pressure, so that the atmospheric pressure correction coefficient becomes greater. See FIG. 2. In this instance, as shown in FIG. 5(a), is the hydrogen discharge time control value t1 (second/operation) becomes greater than the referential hydrogen-discharge time t0 (second/operation). The hydrogen discharge interval control value t1 (second) also becomes greater than the referential hydrogen-discharge interval t10 (second).

Therefore, if the outside air pressure is high and it is difficult for the purge valve 24 to discharge the anode off-gas (hydrogen), the hydrogen discharge time control value t1 (second/operation) that is time for opening the purge valve 24 is set to be larger. This allows the anode off-gas corresponding to the outside air pressure to be fed to the exhaust fuel diluter 32, so that the dilution performance of the exhaust fuel diluter 32 is effectively utilized and the anode off-gas can be diluted before being emitted into the atmosphere. In other words, the anode off-gas is fed to the exhaust fuel diluter 32 for the amount corresponding to the outside air pressure, and so at the downstream of the exhaust fuel diluter 32, the concentration of hydrogen contained in the dilution gas becomes closer to the allowable hydrogen concentration below which the emission of hydrogen is permitted. Therefore, the emission of the anode off-gas (hydrogen) is effectively performed (see FIG. 5(c)) and the power generation efficiency of the fuel cell 10 can be recovered. Further, emitting the anode off-gas at near the allowable hydrogen concentration makes it possible to minimize the number of operations for opening/closing the purge valve 24 and therefore to improve the durability of the purge valve 24.

Running on Highland

When the fuel cell vehicle runs on a highland, the outside air pressure (atmospheric pressure) becomes lower than the referential pressure, so that the atmospheric pressure correction coefficient becomes smaller. See FIG. 2. In this instance, as shown in FIG. 5(b), the hydrogen discharge time control value t2 (second/operation) becomes smaller than the referential hydrogen-discharge time t0 (second/operation). The hydrogen discharge interval control value t12 (second) also becomes smaller than the referential hydrogen-discharge interval t10 (second).

Therefore, if the outside air pressure is low and it is easy for the purge valve 24 to discharge the anode off-gas (hydrogen), the hydrogen discharge time control value t2 (second/operation) that is time for opening the purge valve 24 is set to be smaller. This allows the anode off-gas corresponding to the outside air pressure to be fed to the exhaust fuel diluter 32. In other words, the anode off-gas is fed to the exhaust fuel diluter 32 for the amount corresponding to the outside air pressure, and so at the downstream of the exhaust fuel diluter 32, the concentration of hydrogen contained in the dilution gas becomes closer to the allowable hydrogen concentration. Therefore, the emission of the anode off-gas (hydrogen) is effectively performed (see FIG. 5(c)) and the power generation efficiency of the fuel cell 10 can be recovered. Further, emitting the anode off-gas at near the allowable hydrogen concentration makes it possible to minimize the number of operations for opening/closing the purge valve 24 and therefore to improve the durability of the purge valve 24.

Furthermore, if the altitude is low and the outside air pressure is high, the hydrogen discharge interval control value t1 (second) becomes greater. On the contrary, if the altitude is high and the outside air pressure is low, the hydrogen discharge interval control value t12 (second) becomes smaller. Therefore, irrespective of the atmospheric pressure, the amount of anode off-gas (hydrogen) to be discharged for a predetermined period of time (unit of time T; e.g., five minutes), during which the control of the purge valve 24 is carried out in accordance with step S40 shown in FIG. 3, can be kept constant. In other words, it is possible to maintain the total discharge amount of the anode off-gas to be discharged by a series of opening/closing operations of the purge valve 24 at a constant rate.

The above descriptions will be shown by the following table 1.

TABLE 1

| Altitude | Lowland | Highland |
|---|---|---|
| Outside air pressure (Atmospheric pressure) | High | Low |
| Hydrogen discharge time control value Time for opening purge valve (sec/opn) | Long | Short |
| Discharge amount of Anode off-gas (liter/opn) | Large | Small |
| Hydrogen discharge interval control value (sec) | Long | Short |
| Total discharge amount of Anode off-gas (liter) | Constant | |

While the present invention has been described in detail with reference to a preferred embodiment thereof, the present invention is not limited to this specific embodiment and various changes and modifications may be made without departing from the scope of the attached claims.

According to the above embodiment, (1) when the altitude is low and the outside air pressure is high, the hydrogen discharge time control value (sec/opn) as time for opening the purge valve 24 is set to be greater so that the amount of anode off-gas (liter/opn) to be discharged at a time by opening the purge valve 24 increases while the hydrogen discharge interval control value (sec) is set to be greater. Meanwhile, (2) when the altitude is high and the outside air pressure is low, the hydrogen discharge time control value (sed/opn) is set to be smaller so that the amount of anode off-gas (liter/opn) to be discharged at a time by opening the purge valve 24 decreases while the hydrogen discharge interval control value (sec) is set to be smaller. Therefore, irrespective of the outside air pressure (atmospheric pressure), the total amount of anode off-gas to be discharged for a unit of time T can be kept constant. However, other arrangements or configurations may be employed as long as the total amount of anode off-gas to be discharged for a unit of time T is not kept constant.

For example, the hydrogen discharge interval control value (sec) may be a fixed value, and the hydrogen discharge time control value (sec/opn) may be controlled in accordance with the outside air pressure, thereby controlling the amount of anode off-gas to be discharged by the purge valve 24.

As another modification, the hydrogen discharge time control value (sec/opn) may be fixed to such a value that irrespective of the outside air pressure, high concentration of hydrogen is not discharged under the expected lowest atmospheric pressure. In other words, the amount of anode off-gas (liter/ opn) to be discharged may be a fixed value. And the hydrogen discharge interval control value (sec) may be controlled in accordance with the outside air pressure, thereby controlling the amount of anode off-gas to be discharged by the purge valve 24.

In the above embodiment, the downstream-side pressure (pressure at a downstream of the discharge device) has been described as a pressure detected by the pressure sensor 26 at right downstream of the purge valve 24. However, the downstream-side pressure is not limited to this specific pressure. The downstream-side pressure (pressure at a downstream of the discharge device) may be the atmospheric pressure detected by the atmospheric pressure sensor 41.

Further, in the above embodiment, the present invention has been applied to the anode 12 side of the fuel cell system 1 which employs a hydrogen circulating system. However, other than this arrangement, the present invention may be applied to the cathode 13 side, to which air containing oxygen (reaction gas) is supplied. Also, the present invention may be applied to both the anode side and the cathode side.

Description will be given to the case in which the present invention is applied to the cathode 13 side. In order to improve the usability of oxygen (unreacted reaction gas) contained in the cathode off-gas discharged from the fuel cell 10, the present invention may be adapted to control a discharge valve (discharge device) in a fuel cell system, in which the cathode off-gas is circulated and the opening/closing operations of the discharge valve (discharge device) allows the circulating gas at the cathode 13 side to be supplied to the exhaust fuel diluter 32.

Further, in the above embodiment, the amount of discharged anode off-gas is controlled by the time for opening the purge valve 24. However, the discharge amount may be controlled by the degree of opening for opening the purge valve 24.

In the above embodiment, as shown by steps S10, S20 of FIG. 3, the timing for determining the operating conditions of the purge valve 24 is controlled by the timer. However, a cell voltage monitor may be provided which detects output voltage of single cells of the fuel cell (fuel cell stack) 10, so that the operating conditions of the purge valve 24 are determined when the output voltage of the single cells becomes lower than a predetermined voltage.

Other than the above, a hydrogen sensor may be provided at an upstream of the fuel cell 10, so that the operating conditions of the purge valve 24 are determined when the concentration of hydrogen to be supplied to the fuel cell 10 becomes lower than a predetermined hydrogen concentration.

Further, in the above embodiment, the fuel cell system 1 is mounted on a fuel cell vehicle. However, the use of the fuel cell system is not limited to this specific embodiment, and the fuel cell system may be mounted on other movable members such as a motor cycle.

What is claimed is:

1. A fuel cell system comprising:
   a fuel cell to which a reaction gas is supplied to generate electricity;
   a circulating system which returns unreacted reaction gas discharged from the fuel cell to an upstream of the fuel cell to thereby circulate the unreacted reaction gas;
   a discharge device which discharges the unreacted reaction gas from the circulating system;
   a first pressure detector which detects a pressure at a downstream of the discharge device; and
   a controller which calculates a discharge time during which an amount of discharged gas is discharged from the circulating system by the discharge device and discharge intervals for the discharge device discharging circulating gas, based on the pressure detected by the first pressure detector, such that as the pressure detected by the first pressure detector lowers, the discharge time becomes smaller and the discharge intervals for the discharge device discharging circulating gas become shorter.

2. The fuel cell system according to claim 1, further comprising a second pressure detector which detects a pressure at an upstream of the discharge device, wherein the controller controls the amount of the discharged gas based on a differential pressure between the pressures detected by the first and second pressure detectors.

3. The fuel cell system according to claim 2, wherein the controller controls the amount of the discharged gas such that as the differential pressure is larger, the amount of discharged gas to be discharged at a time becomes smaller and the discharge intervals become shorter.

4. The fuel cell system according to claim 1, wherein the pressure at the downstream of the discharge device is an atmospheric pressure.

5. A method of discharging gas from a fuel cell system including:
   a fuel cell to which a reaction gas is supplied to generate electricity;
   a circulating system which returns unreacted reaction gas discharged from the fuel cell to an upstream of the fuel cell to thereby circulate the unreacted reaction gas;
   a discharge device which discharges the unreacted reaction gas from the circulating system;
   a first pressure detector which detects a pressure at a downstream of the discharge device; and
   a controller which calculates a discharge time during which an amount of discharged gas is discharged from the circulating system by the discharge device and discharge intervals for the discharge device discharging circulating gas, the method comprising the steps of:
   detecting the pressure at the downstream of the discharge device with the first pressure detector; and
   calculating the discharge time during which the amount of discharged gas and the discharge intervals for the discharge device discharging circulating gas based on the pressure detected by the first pressure detector such that the as the pressure detected by the first pressure detector lowers, the discharge time becomes smaller and the discharge intervals for the discharge device discharging the circulating gas become shorter.

6. The method according to claim 5, wherein the fuel cell system further includes a second pressure detector which detects a pressure at an upstream of the discharge device, wherein the controller controls the amount of discharged gas based on a differential pressure between the pressures detected by the first and second pressure detectors.

7. The method according to claim 6, wherein the controller controls the amount of the discharged gas such that as the differential pressure is larger, the amount of discharged gas to be discharged at a time becomes smaller and the discharge intervals become shorter.

8. The method according to claim 5, wherein the pressure at the downstream of the discharge device is an atmospheric pressure.

9. A fuel cell system comprising:
   a fuel cell to which a reaction gas is supplied to generate electricity;

a circulating system which returns unreacted reaction gas discharged from the fuel cell to an upstream of the fuel cell to thereby circulate the unreacted reaction gas;

a discharge device which discharges the unreacted reaction gas from the circulating system;

a first pressure detector which detects a pressure at a downstream of the discharge device;

a second pressure detector which detects a pressure at an upstream of the discharge device; and a controller which controls an amount of discharged gas to be discharged from the circulating system by the discharge device, based on a differential pressure between the pressures detected by the first and second pressure detectors, such that as the differential pressure detected by the first and second pressure detectors is larger, the discharge time becomes smaller and the discharge intervals for the discharge device discharging circulating gas become shorter.

10. The fuel cell system according to claim 9, further comprising an atmospheric pressure sensor for detecting an atmospheric pressure, wherein the controller controls the amount of the discharged gas based on the differential pressure and the atmospheric pressure.

11. A method of discharging gas from a fuel cell system including:

a fuel cell to which a reaction gas is supplied to generate electricity;

a circulating system which returns unreacted reaction gas discharged from the fuel cell to an upstream of the fuel cell to thereby circulate the unreacted reaction gas;

a discharge device which discharges the unreacted reaction gas from the circulating system;

a first pressure detector which detects a pressure at a downstream of the discharge device;

a second pressure detector which detects a pressure at an upstream of the discharge device; and a controller which controls an amount of discharged gas to be discharged from the circulating system by the discharge device, the method comprising the steps of:

detecting the pressure at the downstream of the discharge device with the first pressure detector and the pressure at the upstream of the discharge device with the second pressure detector; and controlling the amount of discharged gas based on a differential pressure between the pressures detected by the first and second pressure detectors, such that as the differential pressure detected by the first and second pressure detectors is larger, the discharge time becomes smaller and the discharge intervals for the discharge device discharging circulating gas become shorter.

12. The method according to claim 11, wherein the fuel cell system further includes an atmospheric pressure sensor for detecting an atmospheric pressure, and wherein controlling the amount of the discharged gas is based on the differential pressure and the atmospheric pressure.

* * * * *